(12) United States Patent  
Takahashi et al.

(10) Patent No.: US 7,459,238 B2  
(45) Date of Patent: Dec. 2, 2008

(54) POSITIVE ELECTRODE ACTIVE MATERIAL FOR LITHIUM ION SECONDARY BATTERY

(75) Inventors: Takeshi Takahashi, Tokushima (JP); Masuhiro Morizaki, Tokushima (JP); Atsushi Takeoka, Tokushima (JP); Junichi Tokuno, Tokushima (JP)

(73) Assignee: Nichia Corporation, Anan (JP)

( * ) Notice: Subject to any disclaimer, the term of this patent is extended or adjusted under 35 U.S.C. 154(b) by 589 days.

(21) Appl. No.: 11/293,173

(22) Filed: Dec. 5, 2005

(65) Prior Publication Data

US 2006/0093549 A1    May 4, 2006

Related U.S. Application Data

(62) Division of application No. 10/320,375, filed on Dec. 17, 2002, now Pat. No. 7,026,068.

(30) Foreign Application Priority Data

Dec. 19, 2001 (JP) ............................. 2001-386536  
Jun. 6, 2002 (JP) ............................. 2002-166082

(51) Int. Cl. *H01M 4/48* (2006.01)

(52) U.S. Cl. ................. 429/231; 429/218.1; 429/231.5; 429/231.95

(58) Field of Classification Search ............... 429/218.1, 429/231.1, 231.95  
See application file for complete search history.

(56) References Cited

U.S. PATENT DOCUMENTS

| | | | |
|---|---|---|---|
| 6,723,470 B2 * | 4/2004 | Barker et al. ............. | 429/231.3 |
| 6,756,155 B1 | 6/2004 | Kweon et al. | |
| 2001/0036579 A1 | 11/2001 | Hosoya | |
| 2002/0037456 A1 | 3/2002 | Hosoya | |
| 2002/0039687 A1 * | 4/2002 | Barker et al. ........... | 429/231.95 |
| 2003/0013017 A1 | 1/2003 | Nagayama et al. | |
| 2003/0143464 A1 | 7/2003 | Yamamoto et al. | |
| 2004/0023113 A1 | 2/2004 | Suhara et al. | |
| 2004/0157125 A1 * | 8/2004 | Takatsuji et al. ......... | 429/231.1 |
| 2004/0197654 A1 * | 10/2004 | Barker et al. ............. | 429/218.1 |
| 2005/0019662 A1 | 1/2005 | Suhara et al. | |

FOREIGN PATENT DOCUMENTS

EP    0 936 687 A2    8/1999

(Continued)

OTHER PUBLICATIONS

European Search Report.  
European Search Report.

*Primary Examiner*—Patrick Ryan  
*Assistant Examiner*—Helen Chu  
(74) *Attorney, Agent, or Firm*—Oliff & Berridge, PLC (57) ABSTRACT

Disclosed is a positive electrode active material for a lithium ion secondary battery, including lithium-transition metal composite oxide of a layer crystal structure, in which the lithium-transition metal composite oxide contains an element that improves conductivity of electrons in the lithium-transition metal composite oxide. Use of this positive electrode active material can improve cycle characteristics, high rate characteristics and thermal stability of lithium ion secondary batteries. Furthermore, by use of this positive electrode active material, gas generation in batteries can be decreased.

1 Claim, 4 Drawing Sheets

FOREIGN PATENT DOCUMENTS

| | | |
|---|---|---|
| EP | 1 154 503 A | 11/2001 |
| JP | 05-151998 | 6/1993 |
| JP | 07-114915 A | 5/1995 |
| JP | 10-027613 | 1/1998 |
| JP | 11-045707 A | 2/1999 |
| JP | 11-273677 A | 10/1999 |
| JP | 2000-21402 | 1/2000 |
| JP | 2000-200607 A | 7/2000 |
| JP | 2000-243394 A | 9/2000 |
| JP | 2000-306584 | 11/2000 |
| JP | 2001-319657 | 11/2001 |
| JP | 2002-279991 A | 9/2002 |
| JP | 2002-373658 A | 12/2002 |
| JP | 2003-20229 | 1/2003 |
| WO | WO 01-92158 A1 | 12/2001 |
| WO | WO 02-054511 A1 | 7/2002 |
| WO | WO 03/069702 A | 8/2003 |

* cited by examiner

POSITIVE ELECTRODE ACTIVE MATERIAL FOR LITHIUM ION SECONDARY BATTERY

CROSS REFERENCE TO RELATED APPLICATION

This is a division of application Ser. No. 10/320,375, filed on Dec. 17, 2002. The entire disclosure of the prior application is hereby incorporated by reference herein in its entirety.

BACKGROUND

The present invention relates to a positive electrode active material for a lithium ion secondary battery (hereinafter also referred to simply as "positive electrode active material"). More specifically, the present invention relates to a positive electrode active material having excellent cyclic charge-discharge characteristics (cycle characteristics) and excellent high rate characteristics and further to a positive electrode active material having less gas generation in addition to these features.

Lithium secondary batteries are widely used as power sources for mobile electronic devices typified by mobile phones and notebook type personal computers. Recently, their application to large capacity power sources such as batteries for electric vehicles is expected.

Currently, various functions are imparted to mobile electronic devices such as mobile phones and accordingly further improvement in high rate characteristics has been required for lithium secondary batteries used as power sources.

In the case, where lithium secondary batteries are used in electric vehicles, service life of 5 years or more is required for the batteries, so that the cycle characteristics of a battery must be improved. Furthermore, in that case, discharging high current becomes necessary, which requires further improvement in high rate characteristics of a battery.

As the positive electrode active materials for lithium ion secondary batteries, mention may be made of a lithium-transition metal composite oxide ($LiMO_2$ (wherein M represents a transition metal element) of a layer crystal structure as typified by lithium cobaltate. As means for improving the cycle characteristics of the positive electrode active material, JP 2000-21402 A (the term "JP XX-XXXXXX A" as used herein means an "unexamined published Japanese patent application") describes having a sulfate group contained in a lithium-containing composite oxide shown to have a composition expressed by the formula $Li_xM_{1-y}N_yO_{2-z}X_a$ (wherein M is Co or Ni, N is a transition metal element not identical with M, or at least one element selected from elements of Groups 2, 13 and 14 of a periodic table, x is a halogen, $0.2<x\leq1.2$, $0\leq y\leq0.5$, $0\leq z\leq1$, $0\leq a\leq2z$) as a positive electrode active material.

However, with the above-mentioned means, it was impossible to satisfy both of the cycle characteristics and high rate characteristics required for lithium ion secondary batteries in recent years.

Furthermore, when a lithium ion secondary battery is left under high temperatures at the time of charging, it may happen that oxygen is released from lithium cobaltate, accompanying transformation or decomposition of the crystals of positive electrode active material. The oxygen oxidizes and burns nonaqueous electrolytic solution to give a significant impact on the safety of the battery. Therefore, further improvement in the thermal stability of positive electrode active material has been desired.

SUMMARY

As described above, presently, no technology that realizes cycle characteristics and high rate characteristics required for mobile electronic devices currently imparted with various functions and high capacity power sources has been fully established yet and improvement in thermal stability is still needed.

Therefore, an object of the present invention is to provide a positive electrode active material having excellent battery characteristics under severer environments. Specifically, it is an object of the present invention to provide a positive electrode active material having excellent cycle characteristics and excellent high rate characteristics and also excellent thermal stability at the time of charging.

Increasing the charging voltage of a lithium ion secondary battery with a view to increasing the discharging capacity thereof may in some cases result in generation of a gas in the battery. The gas may cause a problem in that laminate batteries with battery casing made of a metal laminate resin film and batteries with a thin metal casing as the battery casing, etc. suffer deformation of the battery casing.

Therefore, another object of the present invention is to provide a positive electrode active material which not only has the above-described features but also decreases gas generation in a lithium ion secondary battery.

The inventors of the present invention have made extensive studies with a view to achieving the above-mentioned objects and as a result they have found that the above-mentioned conventional problems can be overcome, thereby achieving the present invention.

A first aspect of the present invention relates to a positive electrode active material for a lithium ion secondary battery, including lithium-transition metal composite oxide of a layer crystal structure, in which the lithium-transition metal composite oxide contains an element that improves conductivity of electrons in the lithium-transition metal composite oxide.

Since the positive electrode active material according to the first aspect of the present invention contains an element that improves conductivity of electrons, it has low electron-migration resistance, and has excellent cycle characteristics, high rate characteristics and thermal stability.

In the first aspect of the present invention, it is preferable that particles of the lithium-transition metal composite oxide have a part or the whole of the element that improves conductivity of electrons on the surface thereof.

In this aspect, the electron-migration resistance is further decreased. Therefore, the cycle characteristics, high rate characteristics, and thermal stability become more excellent.

A second aspect of the present invention relates to a positive electrode active material for a lithium ion secondary battery, including lithium-transition metal composite oxide of a layer crystal structure, in which the lithium-transition metal composite oxide has a sulfate group at least on surfaces of particles of the lithium-transition metal composite oxide.

Since the positive electrode active material according to the second aspect of the present invention has a sulfate group, which improves conductivity of electrons, on surfaces of particles of the lithium-transition metal composite oxide, it has very low electron-migration resistance as well as excellent cycle characteristic, high rate characteristics and thermal stability.

A third aspect of the present invention relates to a positive electrode active material for a lithium ion secondary battery, including lithium-transition metal composite oxide of a layer crystal structure, in which the lithium-transition metal composite oxide has an element which prevents transformation and/or decomposition of crystals thereof.

The positive electrode active material according to the third aspect of the present invention is considered to have a stable crystal structure, since it has an element that prevents transformation and/or decomposition of crystals thereof. This results in a battery which has a significantly low coefficient of expansion and very excellent battery characteristics (cycle characteristics and high rate characteristics).

A fourth aspect of the present invention relates to a positive electrode active material for a lithium ion secondary battery, including lithium-transition metal composite oxide of a layer crystal structure, in which the lithium-transition metal composite oxide has an element which reduces lattice constant of unit lattice of crystals thereof.

The positive electrode active material according to the fourth aspect of the present invention is considered to have a decreased amount of gas generated in a battery, since it has the element that reduces the lattice constant of unit lattice of crystals thereof, which presumably prevents decomposition, etc. of the positive electrode active material, thereby preventing oxidative decomposition reaction of an electrolyte.

In the fourth aspect of the present invention, it is preferred that c-axis length of the lattice constant be 14.010 Å or less. When the c-axis length of the lattice constant is 14.010 Å or less, it is considered to have a further decreased amount of gas generated in a battery, since decomposition, etc. of the positive electrode active material will be particularly prevented.

Preferably, the above-mentioned element, i.e., the element which improves conductivity of electrons according to the first aspect of the present invention, the element which prevents transformation and/or decomposition of crystals in the third aspect of the present invention, or the element which reduces the lattice constant of a unit lattice in the fourth aspect of the present invention, includes each at least one element selected from the group consisting of Mg, Ba, Ti, Al, V, Zr, Ca, Sr, S and halogens.

With these elements, the cycle characteristics, high rate characteristics and thermal stability can be improved. Also, it can reduce gas generation in batteries.

A fifth aspect of the present invention relates to a positive electrode active material for lithium ion secondary batteries expressed by general formula $Li_vCo_{1-x}M^1_wM^2_xO_yS_z$ (wherein $M^1$ represents Al or Ti; $M^2$ represents Mg and/or Ba; v represents a number satisfying $0.95 \leq v \leq 1.05$; w represents 0, or a number satisfying $0<w\leq 0.10$ when $M^1$ is Al or a number satisfying $0<w\leq 0.05$ when $M^1$ is Ti; x represents a number satisfying $0<x\leq 0.10$; y represents a number satisfying $1\leq y \leq 2.5$; and z represents a number satisfying $0<z\leq 0.015$).

The positive electrode active material according to the fifth aspect of the present invention has excellent cycle characteristic, high rate characteristics, and thermal stability. Also, it can reduce gas generation in batteries.

It is preferred that the positive electrode active material according to the fifth aspect of the present invention correspond to at least one of the first to fourth aspects of the present invention.

A sixth aspect of the present invention relates to a positive electrode active material for lithium ion secondary batteries expressed by general formula $Li_aCo_{1-b}M_bO_cX_dS_e$ (wherein M represents at least one element selected from the group consisting of Ti, Al, V, Zr, Mg, Ca and Sr; x represents at least one selected from halogens; a represents a number satisfying $0.95 \leq a \leq 1.05$; b represents a number satisfying $0<b\leq 0.10$; c represents a number satisfying $1\leq c \leq 2.5$; d represents a number satisfying $0<d\leq 0.1$; and e represents a number satisfying $0<e\leq 0.015$).

The positive electrode active material according to the sixth aspect of the present invention has excellent cycle characteristics, high rate characteristics, and thermal stability. Also, it can reduce gas generation in batteries.

This may be attributable to the following. That is, introduction of at least one element selected from the group consisting of Ti, Al, V, Zr, Mg, Ca and Sr in the positive electrode active material to form solid solution reduces the lattice constant. This reduces changes in volume accompanying charging and discharging, resulting in relaxation of stress exerted on particles of the positive electrode active material. This prevents decomposition, etc. of the positive electrode active material, which in turn prevents oxidative decomposition reaction in the electrolyte, resulting in a reduction in the amount of gas generated in batteries. Furthermore, it is presumed that among the above-mentioned elements, those which are not contained in the solid solution react with halogens and element S to cover the positive electrode active material to mitigate influences to the negative electrode. This also is considered to reduce the amount of the gas.

It is preferred that the positive electrode active material according to the sixth aspect of the present invention correspond to at least one of the first to fourth aspects of the present invention.

As described below, use of the positive electrode active materials according to the first to sixth aspects of the present invention (hereinafter referred to simply as "positive electrode active material according to the present invention) can improve cycle characteristics, high rate characteristics and thermal stability of lithium ion secondary batteries. This enables realization of lithium ion secondary batteries having excellent battery characteristics which have not been achieved conventionally and application of such batteries in various fields.

Furthermore, by use of the positive electrode active materials according to the present invention, gas generation in batteries can be decreased.

DETAILED DESCRIPTION OF EMBODIMENTS

Hereinafter, the present invention will be described in detail. However, the present invention should not be considered to be limited to the present embodiments of the invention and examples below.

The positive electrode active materials of the first to fourth aspects of the present invention have each a lithium-transition metal composite oxide of a layer crystal structure.

The layer crystal structure is not particularly limited, and examples thereof include a layer rock salt structure and a zig-zag layer rock salt structure. Among them, the layer rock salt structure is preferred.

The lithium-transition metal composite oxide is not particularly limited, and suitable examples thereof include lithium cobaltate, lithium nickelate, lithium chromate, lithium vanadate, lithium manganate, and lithium ferrate. Among them, lithium cobaltate and lithium nickelate are preferred, with lithium cobaltate being particularly preferred.

The element which improves the conductivity of electrons in the lithium-transition metal composite oxide used in the first aspect of the present invention is not particularly limited and suitable examples thereof include Mg, Ba, Ti, Al, V, Zr, Ca, Sr, S and halogens. Among them, Mg, Ti, Al, V, Sr and S are preferred.

The conductivity of electrons can be measured by chronoamperometry, etc.

In consideration of a further decrease in electron-migration resistance, it is preferred that the lithium-transition metal composite oxide has a part or the whole of the element which improves the conductivity of electrons on the surface of the particles thereof.

The element which improves the conductivity of electrons may be a part of a group. Preferably, such a group includes, for example, a sulfate group used in the second aspect of the present invention as described hereinbelow.

In the second aspect of the present invention, the lithium-transition metal composite oxide has a sulfate group on the surface of the particles thereof.

Figure 1:
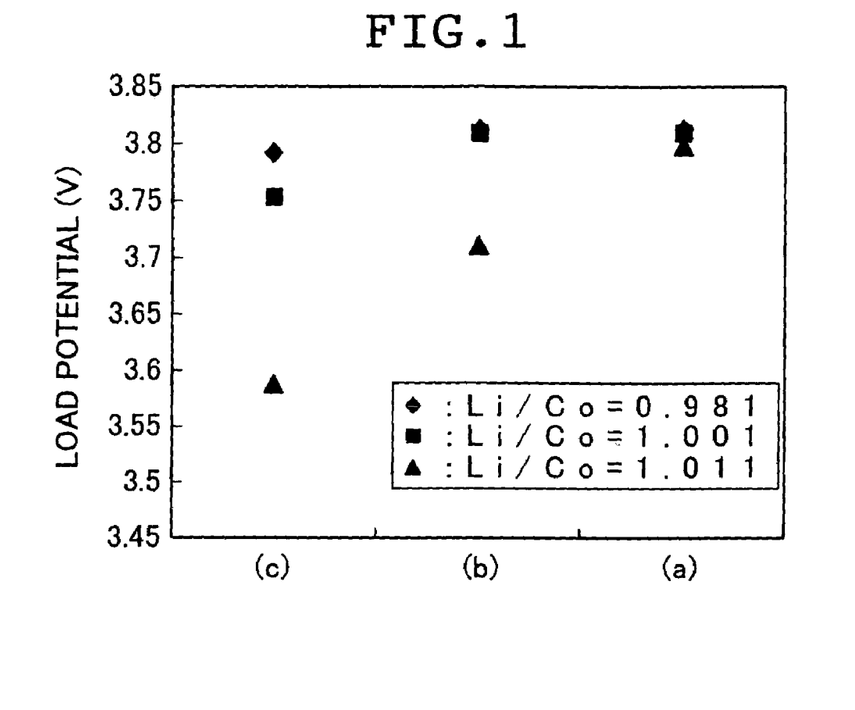
FIG. 1 is a graph showing load potentials of lithium ion secondary batteries with using one of lithium-transition metal composite oxide having sulfate group on the surface of particles thereof, lithium-transition metal composite oxide having sulfate group inside particles thereof, and lithium-transition metal composite oxide having no sulfate group, as the positive electrode active material.
Figure 2:
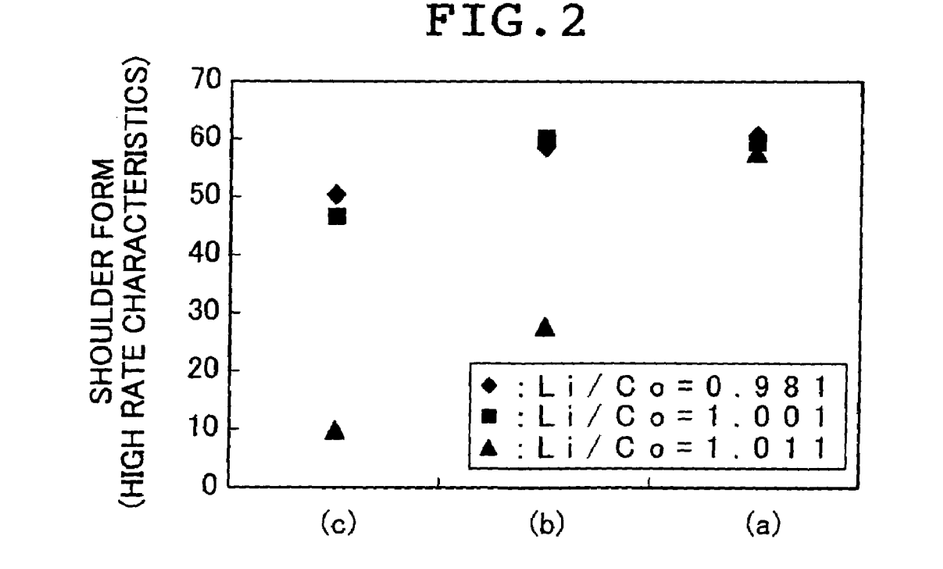
FIG. 2 is a graph showing shoulder forms (high rate characteristics) of lithium ion secondary batteries with using one of lithium-transition metal composite oxide having sulfate group on the surface of particles thereof, lithium-transition metal composite oxide having sulfate group inside particles thereof, and lithium-transition metal composite oxide having no sulfate group, as the positive electrode active material.
Figure 3:
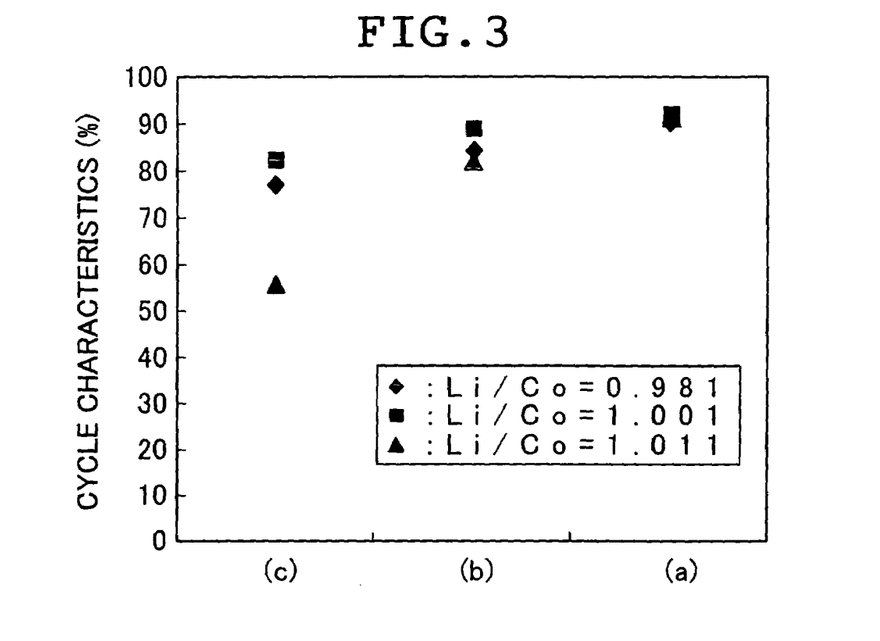
FIG. 3 is a graph showing cycle characteristics of lithium ion secondary batteries with using one of lithium-transition metal composite oxide having sulfate group on the surface of particles thereof, lithium-transition metal composite oxide having sulfate group inside particles thereof, and lithium-transition metal composite oxide having no sulfate group, as the positive electrode active material.

FIGS. 1 to 3 are graphs showing load potential, shoulder form (high rate characteristics) and cycle characteristics, respectively, of lithium ion secondary batteries with (a) lithium-transition metal composite oxide having sulfate groups on the surface of the particles thereof, (b) lithium-transition metal composite oxide having sulfate groups inside the particles thereof, and (c) lithium-transition metal composite oxide having no sulfate groups as the positive electrode active materials.

The conditions of experiments whose results are shown in FIGS. 1 to 3 are the same as those in Examples for the shoulder form (high rate characteristics) and cycle characteristics. The load potential was determined as follows. That is, a cylindrical battery subjected to aging charging-discharging was charged at constant current and constant voltage with a current of 3.2 A to a voltage of 4.2 V at 25° C., further discharged with a current of 3.2 A to a voltage of 2.75 V. An average potential obtained was defined as load potential.

As shown in FIGS. 1 to 3, in the case where sulfate groups are present on the surface of particles of the lithium-transition metal composite oxide, the average potential under load is high and the high rate characteristics and the cycle characteristics are excellent as compared with those where sulfate groups are present inside the particles.

Figure 4:
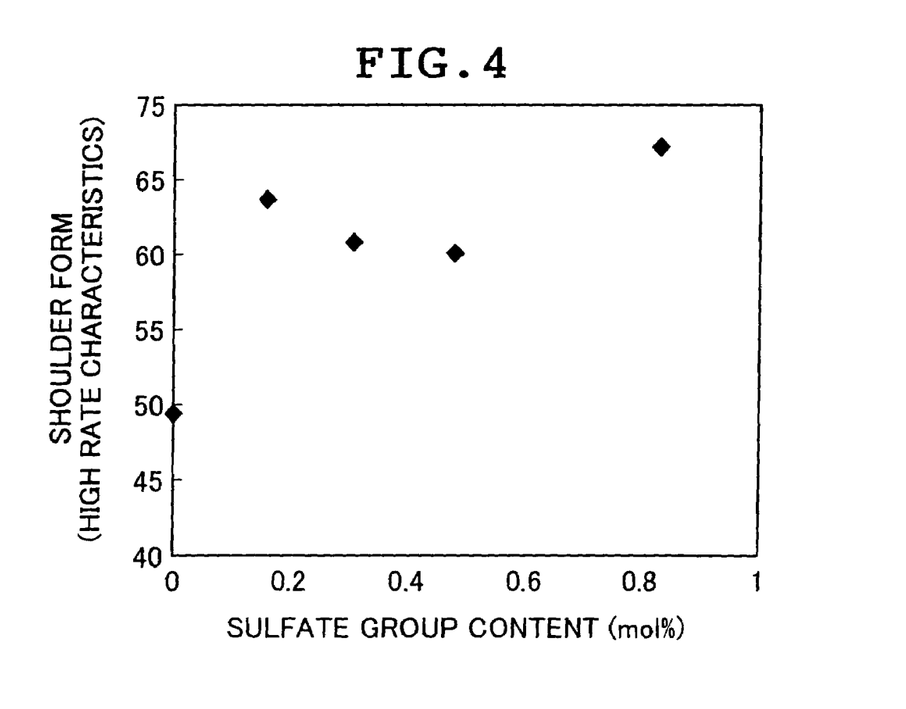
FIG. 4 is a graph showing a shoulder form (high rate characteristics) of a lithium ion secondary battery with using a lithium-transition metal composite oxide having a varied amount of sulfate group on the surface of particles thereof as the positive electrode active material.
Figure 5:
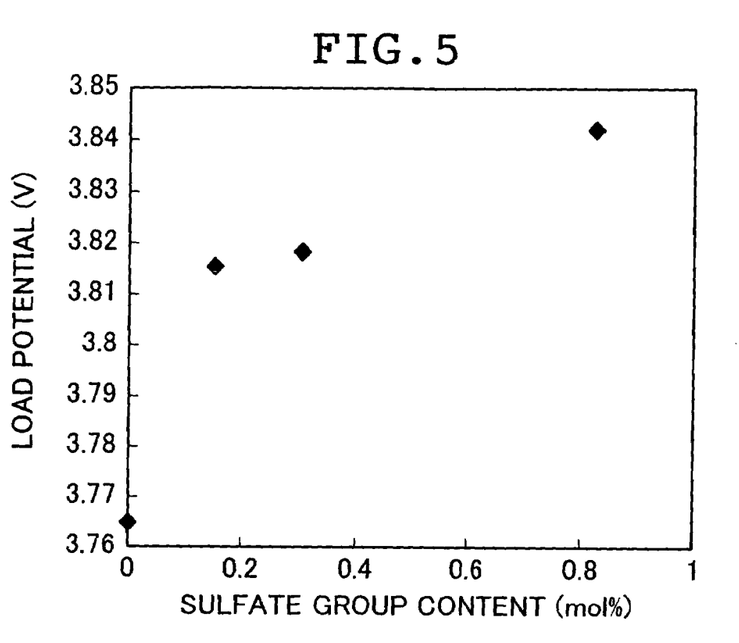
FIG. 5 is a graph showing a load potential of a lithium ion secondary battery with using a lithium-transition metal composite oxide having a varied amount of sulfate group on the surface of particles thereof as the positive electrode active material.
Figure 6:
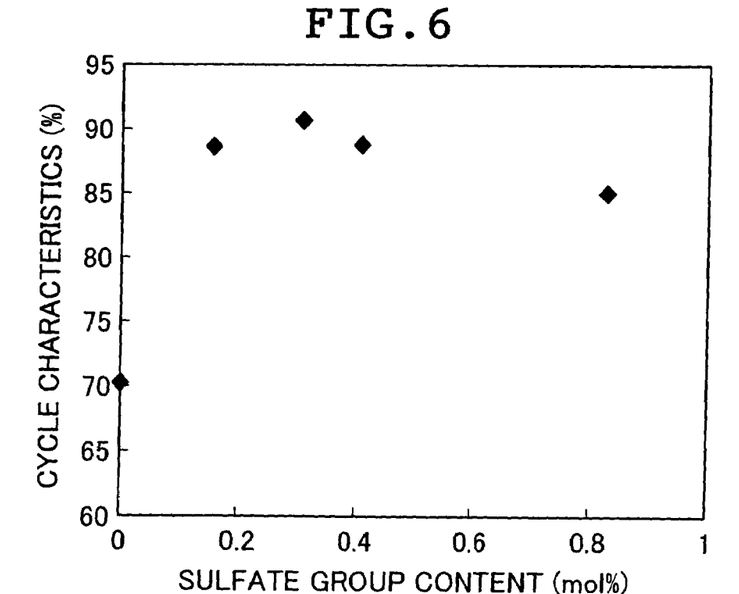
FIG. 6 is a graph showing a cycle characteristics of a lithium ion secondary battery with using a lithium-transition metal composite oxide having a varied amount of sulfate group on the surface of particles thereof as the positive electrode active material.

FIGS. 4 to 6 are graphs showing, shoulder form (high rate characteristics), load potential and cycle characteristics, respectively, of lithium ion secondary batteries with lithium-transition metal composite oxides having different amounts of sulfate group on the surface of the particles thereof as the positive electrode active materials.

The conditions of experiments whose results are shown in FIGS. 4 to 6 are the same as those in Examples for the shoulder form (high rate characteristics) and cycle characteristics. The load potential was determined in the same manner as in the case of FIGS. 1 to 3.

As shown in FIGS. 4 to 6, the high rate characteristics, average potential under load, and cycle characteristics increase with an increasing amount of sulfate group on the surface of the particles of the lithium-transition metal composite oxide. Furthermore, the comparison of Example 7 with Example 8 described hereinbelow reveals that an increasing amount of sulfate group results in an increase in thermal stability.

The results shown in FIGS. 1 to 6 may be attributable to improvement in conductivity of electrons around the particles by the sulfate groups present on the surface of the particles of the lithium-transition metal composite oxide.

Figure 7:
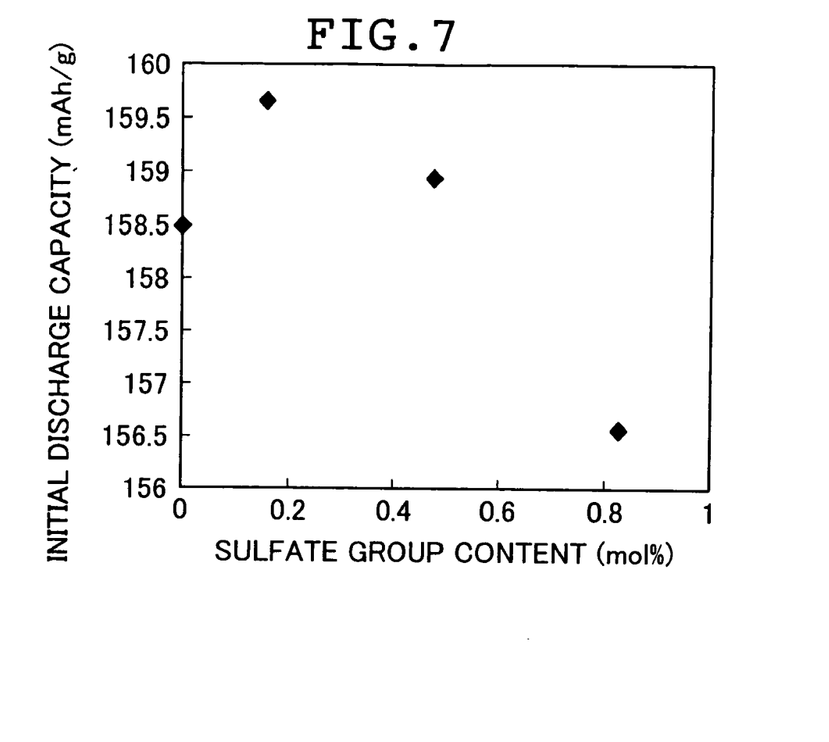
FIG. 7 is a graph showing an initial discharge capacity of a lithium ion secondary battery with using a lithium-transition metal composite oxide having a varied amount of sulfate group on the surface of particles thereof as the positive electrode active material.

FIG. 7 is a graph showing initial discharge capacities of the lithium ion secondary batteries with lithium-transition metal composite oxide having different amounts of sulfate group on the surface of particles thereof.

The conditions of experiments whose results are shown in FIG. 7 are the same as those in Examples.

As shown in FIG. 7, the initial discharge capacity varies depending on the amount of sulfate group on the surface of the particles of the lithium-transition metal composite oxide.

Therefore, in consideration of a balance among the initial discharge capacity, high rate characteristics, load potential, and cycle characteristics, a proportion of sulfate groups present on the surface of the particles of a lithium-transition metal composite oxide is preferably 1 mol % or less, more preferably 0.8 mol % or less, and still more preferably 0.6 mol % or less, and preferably 0.01 mol % or more, and more preferably 0.03 mol % or more, with respect to the lithium-transition metal composite oxide.

In the second aspect of the present invention, the effects of the present invention are exhibited regardless of the manner in which the sulfate groups exist on the surface of the particles of the lithium-transition metal composite oxide. For example, the high rate characteristics, average potential under load, cycle characteristics, and thermal stability will increase either when the sulfate groups form a film on the surface (i.e., cover a whole of the surface) of the particles of the lithium-transition metal composite oxide or when the sulfate groups cover a part of the surface of the particles of the lithium-transition metal composite oxide.

Furthermore, the sulfate groups are just needed to be present at least on the surface of the particles. Therefore, a part of the sulfate groups may be present inside the particles.

Whether or not the sulfate groups are present on the surface of the particles of the lithium-transition metal composite oxide can be analyzed by various methods, for example, AES (Auger Electron Spectroscopy). Various methods can be used for quantitation of sulfate groups. The quantitation may be made by, for example, ICP fluorescent spectrometry or titration method.

The sulfate group used in the second aspect of the present invention includes sulfate ion, a group of atoms derived by removing the charge therefrom and sulfo group. Preferably, it is based on at least one selected from the group consisting of alkali metal sulfates, alkaline-earth metal sulfates, transition metal sulfates, and sulfates of organic compounds.

It is preferred that it be based on, among them, at least one selected from the group consisting of alkali metal sulfates and alkaline-earth metal sulfates. More preferably, it is based on alkali metal sulfates. This is because these sulfates are chemically stable since they result from coupling between a strong acid and a strong base.

Specific examples thereof include inorganic salts such as iron sulfate, cobalt sulfate, nickel sulfate, zinc sulfate, copper sulfate, lithium sulfate, sodium sulfate, magnesium sulfate, calcium sulfate and potassium sulfate. Among them, lithium sulfate, sodium sulfate, magnesium sulfate, and calcium sulfate are preferred. Lithium sulfate and sodium sulfate are more preferred.

As organic salts, for example, tetrabutylammonium hydrogen sulfate, trifluoromethanesulfonic acid, 1-naphthylamine-2-sulfonic acid, and 1-naphthylamine-2,6-disoulfonic acid may be mentioned.

These sulfates may be either anhydrides or hydrates.

The lithium-transition metal composite oxides used in the second aspect of the present invention are not particularly limited and preferred examples of which are as shown below.

For example, mention may be made of a lithium-transition metal composite oxide that may be obtained by having a lithium-transition metal composite oxide expressed by general formula $Li_kMO_m$ (wherein M represents Co and/or Ni; k represents a number satisfying $0.95<k\leq1.10$; and m represents a number satisfying $1.8<m<2.2$) contained at least one element selected from the group consisting of transition metal elements other than the M, elements of Groups 2, 13 and 14 of a periodic table, and halogens.

By containing the above-mentioned elements, excellent improvement of cycle characteristics and high rate characteristics can be realized.

Also, mention may be made of, for example, a lithium-transition metal composite oxide containing as least one element selected from the group consisting of aluminum, magnesium, manganese, titanium and zirconium, and sulfur, expressed by formula $Li_xMO_y$ (wherein M represents Co and/or Ni; x represents a number satisfying $0.95<x\leq1.10$; and y represents a number satisfying $1.8<y<2.2$). By containing these elements, batteries will have decreased expansion coefficient and increased capacity retention.

Specifically, mention may be made of, for example, a lithium-transition metal composite oxide expressed by general formula (wherein M represents Co and/or Ni; Z represents at least one element selected from the group consisting of transition metals other than the M and elements of Groups 2, 13 and 14 of a periodical table; x represents a halogen; k represents a number satisfying $0.95<k\leq1.10$; n represents a number satisfying $0\leq n\leq0.5$; p represents a number satisfying $0\leq p\leq1$; and r represents a number satisfying $0\leq r\leq2p$).

This is a lithium-transition metal composite oxide which has a hexagonal crystal expressed by $LiCoO_2$, $LiNiO_2$ or $Li(Co, Ni)O_2$ as base crystal and whose Co and/or Ni is partly substituted by at least one element selected from the group consisting of transition metals other than Co and/or Ni and elements of Groups 2, 13 and 14 of a periodical table or by the at least one element and the halogen.

In this case, excellent improvement in cycle characteristics and high rate characteristics can be realized.

Also, mention may be made of a lithium-transition metal composite oxide expressed by general formula (wherein $M^1$ represents Co and/or Ni; $M^2$ represents at least one element selected from Al, Mg, Mn, Ti and Zr; x represents a number satisfying $0<x\leq0.02$; y represents a number satisfying $0.95\leq y\leq1.10$; and z represents a number satisfying $1.8<z<2.2$).

In this case, batteries will have decreased expansion coefficient and increased capacity retention.

Also, the positive electrode active material of the fifth and sixth aspects of the present invention are preferably exemplified.

More specifically, there may be named $Li_{1.01}Ni_{0.50}Co_{0.30}Mn_{0.20}O_2$, $Li_{0.98}Ni_{0.60}Co_{0.30}Mn_{0.10}O_2$, $Li_{1.02}Ni_{0.30}Co_{0.30}Mn_{0.40}O_2$, $Li_{1.01}Ni_{0.59}Co_{0.21}Mn_{0.20}O_2$, $Li_{1.01}Ni_{0.50}Co_{0.20}Mn_{0.30}O_2$, $Li_{1.04}Ni_{0.20}Co_{0.20}Mn_{0.60}O_2$, $Li_{1.05}Ni_{0.30}Co_{0.20}Mn_{0.50}O_2$, $Li_{0.998}Ni_{0.396}Co_{0.304}Mn_{0.300}O_2$, $Li_{0.97}Ni_{0.693}Co_{0.297}Cu_{0.0099}O_2Li_{0.99}Ni_{0.693}Co_{0.297}Ti_{0.0099}O_2$, $Li_{0.97}Ni_{0.693}Co_{0.297}Zn_{0.0099}O_2$, $Li_{0.98}Ni_{0.693}Co_{0.297}Mn_{0.0099}O_2$, $Li_{0.943}Ni_{0.666}Cu_{0.286}Cu_{0.048}O_2$, $LiNi_{0.725}Co_{0.275}O_2$, $LiNi_{0.7}Co_{0.3}O_2$, $Li_{1.04}Ni_{0.75}Co_{0.25}O_2$, $Li_{1.05}Ni_{0.82}Co_{0.15}Al_{0.03}O_2$, $LiNi_{0.82}Co_{0.15}Al_{0.03}O_2$, $Li_{1.01}Ni_{0.70}Co_{0.20}Al_{0.10}O_2$, $LiNi_{0.57}Co_{0.33}Mn_{0.1}O_2$, $Li_{1.02}Ni_{0.7}Co_{0.3}O_2$, $Li_{1.00}Co_{0.998}Zr_{0.002}O_2$.

In the third aspect of the present invention, the element which prevents transformation and/or decomposition of the crystal of lithium-transition metal composite oxide is not particularly limited and suitable examples thereof include Mg, Ba, Ti, Al, V, Zr, Ca, Sr, S and halogens. Among them, Mg, Ba, Ti, Al, Zr and S are preferred.

Transformation of crystal can be measured by x ray diffraction, etc. Decomposition of crystal can be measured by x ray diffraction, etc.

In the fourth aspect of the present invention, the element which reduces the lattice constant of unit lattice of the crystal of the lithium-transition metal composite oxide is not particularly limited and suitable examples thereof include Mg, Ba, Ti, Al, V, Zr, Ca, Sr, S and halogens. Among them, Mg, Ba, Al, and Ca are preferred.

Lattice constants can be measured by x ray diffraction, etc.

The c-axis length of the lattice constant is preferably 14.010 Å or less, and more preferably 14.004 to 14.008 Å.

The positive electrode active materials according to the fifth aspect of the present invention are positive electrode active materials for lithium ion secondary batteries expressed by general formula (wherein $M^1$ represents Al or Ti; $M^2$ represents Mg and/or Ba; v represents a number satisfying $0.95 \leq v \leq 1.05$; w represents 0, or a number satisfying $0 < w \leq 0.10$ when $M^1$ is Al or a number satisfying $0 < w \leq 0.05$ when $M^1$ is Ti; x represents a number satisfying $0 < x \leq 0.10$; y represents a number satisfying $1 \leq y \leq 2.5$; and z represents a number satisfying $0 < z \leq 0.015$).

Among them, suitable examples include those positive electrode active material for lithium ion secondary batteries expressed by general formula $$Li_vCo_{1-x}Al_wM^2_xO_yS_z$$

(wherein w represents a number satisfying $0 < w \leq 0.10$; other symbols are the same as those defined in the above formula), those positive electrode active material for lithium ion secondary batteries expressed by general formula $$Li_vCo_{1-x}Ti_wM^2_xO_yS_z$$

(wherein w represents a number satisfying $0 < w \leq 0.05$; other symbols are the same as those defined in the above formula), and those positive electrode active material for lithium ion secondary batteries expressed by general formula $$Li_vCo_{1-x}M^2_xO_yS_z$$

(wherein symbols are the same as those defined in the above formula).

Amount of Li (value of v) influences discharge capacity and high load capacity of lithium ion secondary batteries. On the other hand, amount of $M^1$ (value of w), amount of $M^2$ (value of x), and amount of S (value of z) strongly influence the gas generation and battery characteristics (cycle characteristics and high rate characteristics) of a lithium ion secondary battery. Preferably, x and z are numbers satisfying $0.0001 \leq x \leq 0.05$ and $0.003 \leq z \leq 0.009$, respectively. When $M^1$ is Al and/or Ti, w is preferably a number satisfying $0.0001 \leq w \leq 0.05$. On the other hand, amount of O (value of y) varies depending on the method by which element S is introduced into the positive electrode active material.

The positive electrode active materials for lithium ion secondary batteries according to a sixth aspect of the present invention are positive electrode active materials for lithium ion secondary batteries expressed by general formula $$Li_aCo_{1-b}M_bO_cX_dS_e$$

(wherein M represents at least one element selected from the group consisting of Ti, Al, V, Zr, Mg, Ca and Sr; x represents at least one selected from halogens; a represents a number satisfying $0.95 \leq a \leq 1.05$; b represents a number satisfying $0 < b \leq 0.10$; c represents a number satisfying $1 \leq c \leq 2.5$; d represents a number satisfying $0 < d \leq 0.1$; and e represents a number satisfying $0 < e \leq 0.015$).

Preferably, M is at least one element selected from the group consisting of Ti, Al, Mg and Ca. x is preferably at least one element selected from the group consisting of F, Cl, Br and I, with F and/or Cl being particularly preferred.

Amount of Li (value of a) influences discharge capacity and high load capacity of lithium ion secondary batteries. On the other hand, amount of M (value of b), amount of x (value of d) and amount of S (value of e) strongly influence the gas generation, battery characteristics (cycle characteristics and high rate characteristics), and thermal stability of a lithium ion secondary battery. Preferably, b, d and e are numbers satisfying $0.0005 \leq b \leq 0.05$, $0.001 \leq d \leq 0.07$, and $0.0005 \leq e \leq 0.009$, respectively. On the other hand, amount of O (value of c) varies depending on the method by which halogen and element S are introduced into the positive electrode active material.

In the first to sixth aspects of the present invention, the lithium-transition metal composite oxide has a specific surface area of preferably 0.2 to 2.0 $m^2/g$, more preferably 0.2 to 1.2 $m^2/g$, and still more preferably 0.4 to 0.8 $m^2/g$. Within the above-mentioned ranges, the gas generation can be minimized.

Furthermore, in the first to sixth aspects of the present invention, it is preferred that a proportion of particles of the lithium-transition metal composite oxide having a volume based particle size of 1 μm or less be 10 vol % or less based on the total particles. Within the above-mentioned range, the gas generation can be minimized.

The positive electrode active material according to the present invention can be produced by various methods which are not particularly limited and which include, for example, (1) to (3) below.

(1) Preparation of Raw Material Mixtures

Raw material mixtures are selected depending on elements which constitute targeted compositions. Preferably, positive electrode active materials according to the present invention contain Co and/or Ni, and Li. Therefore, it is preferred that at least one compound which contains Co and/or Ni and a lithium compound be used as raw materials.

The lithium compound is not particularly limited and examples thereof include $Li_2CO_3$, LiOH, $LiOH.H_2O$, $Li_2O$, LiCl, $LiNO_3$, $Li_2SO_4$, $LiHCO_3$, and $Li(CH_3COO)$.

As the compound which contains Co and/or Ni, mention may be made of those compounds which give rise through calcination to composite oxides containing targeted metal elements, for example, hydroxides, nitrates, carbonates and chlorides. Where the positive electrode active material according to the present invention contains both Co and Ni, compounds which can be used as raw materials may be mixtures of compounds of respective metal elements, or compounds each of which contains a plurality of metal elements such as coprecipitate.

Furthermore, boron compounds, phosphorus compounds, sulfur compounds, etc. which are generally employed as fluxes may be added to compounds serving as raw materials before they can be used.

Examples of the boron compound include $B_2O_3$ and $H_3BO_3$. Examples of the phosphorus compound include phosphoric acid. Suitable examples of the sulfur compound include $Li_2SO_4$, $MnSO_4$, $(NH_4)_2SO_4$, $Al_2(SO_4)_3$, and $MgSO_4$.

Moreover, to improve particle properties, also compounds which contain halogens may be used. Examples of the compound which contain halogen include $NH_4F$, $NH_4C_1$, $NH_4Br$, $NH_4I$, LiF, LiCl, LiBr, LiI, $MnF_2$, $MnCl_2$, $MnBr_2$ and $MnI_2$.

The above-mentioned compounds are mixed so that the respective constituent elements are contained in predetermined compositional ratios. On this occasion, compounds in the form of powder may be mixed as they are or they may be converted into slurry with water and/or organic solvent and then mixed. This slurry mixture is dried into a raw material mixture.

(2) Calcination and Pulverization of Raw Material Mixture

Subsequently, the raw material mixture is calcined. Temperature, time, atmosphere, etc. of calcination are not particularly limited and may be decided appropriately depending on a purpose.

Calcination temperature is preferably 500° C. or more, more preferably 600° C. or more, and still more preferably 800° C. or more. If the calcination temperature is too low, unreacted raw materials may remain in the resultant positive electrode active material, resulting in failure of taking advantage of the features inherent to the positive electrode active material. On the other hand, the calcination temperature is preferably 1,300° C. or less, and more preferably 1,000° C. or less. If the calcination temperature is too high, the resultant positive electrode active material may have a particle size too large, resulting in a decrease in battery characteristics.

Calcination time of 1 to 24 hours is generally preferred. If the calcination time is too short, diffusion reaction between raw material particles will not proceed. On the other hand, if the calcination time is too long, the calcination after the time when the diffusion reaction is substantially completed will become useless.

Examples of calcination atmosphere include atmospheric gas, oxygen gas, mixed gases composed of these gases and inert gases such as nitrogen gas and argon gas.

After calcination, the product is pulverized by mortars, ball mills, vibration mills, jet mils, etc. to obtain powder having an objective particle size. Thus, pulverization after calcination can make specific surface area of the powder within the above-described suitable ranges.

(3) Addition of Sulfates

In the second aspect of the present invention, it is preferred to add sulfates to the calcined product or pulverisate thereof obtained as described above. By this method, sulfate groups can easily be present on the surface of the particles. For addition of sulfates, a commercially available mixer may be used.

Alternatively, sulfates may be added at the time of mixing raw materials and thereafter the raw material mixture containing sulfate may be calcined.

The positive electrode active materials according to the present invention are used in lithium ion secondary batteries. The construction of a ion secondary battery other than the positive electrode active material may be conventional one.

As a negative electrode active material, metallic lithium, lithium alloys or compounds which can occlude and release lithium ions can be used. Examples of lithium alloy include LiAl alloys, LiSn alloys and LiPb alloys. Examples of the compound which can occlude and release lithium ions include carbon materials such as graphite (black lead).

An electrolytic solution is not particularly limited so far as it is not denatured nor decomposed at operating voltage.

Examples of a solvent include organic solvents such as dimethoxyethane, diethoxyethane, ethylene carbonate, propylene carbonate, dimethyl carbonate, diethyl carbonate, ethyl methyl carbonate, methyl formate, γ-butyrolactone, 2-methyltetrahydrofuran, dimethyl sulfoxide and sulfolane. These may be used singly or two or more of them may be used as mixtures.

Examples of an electrolyte include lithium salts such as lithium perchlorate, lithium tetrafluoroborate, lithium tetrafluorophosphate, and lithium trifluoromethanoate.

The above-mentioned solvent and electrolyte are mixed to form an electrolytic solution. Here, the electrolytic solution may be used in a form of gel by adding a gelling agent thereto. Alternatively, the electrolytic solution may be used as absorbed by a hygroscopic polymer. Furthermore, inorganic or organic solid electrolytes having lithium ionic conductivity may also be used.

Examples of a separator include porous membranes made of polyethylene, polypropylene, etc.

A lithium ion secondary battery may be fabricated by assembling the positive electrode active material according to the present invention, and the above-mentioned negative electrode active material, electrolytic solution and separator by a conventional method. With the lithium ion secondary battery, excellent battery characteristics which have not conventionally been attained can be realized.

EXAMPLES

Hereinafter, the present invention will be described in detail by examples. However, the present invention should not be considered to be limited thereto.

1. Preparation of Positive Electrode Active Material

Example 1

Litihum carbonate and tricobalt tetroxide ($Co_3O_4$) in which magnesium and calcium were contained in advance were weighed so as to have predetermined compositional ratios, mixed by dry process to obtain a raw material mixture. The raw material mixture was calcined in atmospheric gas at 900° C. After the calcination, the product was pulverized in a vibration mill and passed through a #200 sieve. On the other hand, after drying, lithium sulfate hydrate ($Li_2SO_4.H_2O$) was pulverized in a vibration mill and passed through a #200 sieve. Thereafter, both the powders were mixed in a Henschel mixer and recalcined at 900° C. to obtain a positive electrode active material. The thus obtained positive electrode active material had a composition of $Li_{1.001}Co_{0.9997}Ca_{0.0002}Mg_{0.0001}O_2$. The proportion of sulfate group was 0.713 mol % based on the lithium-transition metal composite oxide.

Examples 2 to 5

Litihum carbonate, tricobalt tetroxide in which magnesium and calcium were contained in advance, and lithium sulfate hydrate were weighed so as to have predetermined compositional ratios, mixed by dry process to obtain raw material mixtures. The thus obtained mixed powders were calcined in atmospheric gas at 900° C. for 10 hours to obtain positive electrode active materials having a compositional formula of $Li_{1.00}Co_{0.9997}Ca_{0.0002}Mg_{0.0001}O_2$. These were pulverized by using a mortar.

Average particle size and proportion of sulfate group to lithium-transition metal composite oxide obtained are as follows.

Example 2: Average particle size 4.5 μm, proportion of sulfate group 0.163 mol %

Example 3: Average particle size 4.2 μm, proportion of sulfate group 0.306 mol %

Example 4: Average particle size 4.1 μm, proportion of sulfate group 0.479 mol %

Example 5: Average particle size 4.6 μm, proportion of sulfate group 0.825 mol %

Example 6

Litihum carbonate, tricobalt tetroxide with which 0.06 mol % of sulfate group based on Co was mixed in advance, and zirconium oxide were metered so as to satisfy the relationships Li/(Co+Zr)=1.00, and Zr/(Co+Zr)=0.002, and mixed by dry process. The thus obtained mixed powder was calcined in atmospheric gas at 900° C. for 10 hours to obtain a positive electrode active material having a compositional formula of $Li_{1.00}Co_{0.998}Zr_{0.002}O_2$. This was pulverized by using a mortar to make an average particle size of 6.1 µm. Proportion of sulfate group was 0.051 mol % based on the lithium-transition metal composite oxide.

Examples 7 and 8

Tricobalt tetroxide, sulfate group and lithium carbonate were metered so as to satisfy the relationship Li/Co=0.995, and mixed by dry process. The obtained mixed powder was calcined in atmospheric gas at 900° C. for 10 hours to obtain a positive electrode active material having a compositional formula of $Li_{0.995}Co_{0.9995}Ni_{0.0005}O_2$.

Proportion of the sulfate group to the lithium-transition metal composite oxide and heat generation starting temperature in evaluation of thermal stability were as follows.

Example 7: Proportion of the sulfate group 0.428 mol %, heat generation starting temperature 189.8° C.

Example 8: Proportion of the sulfate group 0.01 mol %, heat generation starting temperature 186.6° C.

On the other hand, the positive electrode active materials obtained in Examples 2 to 5 were analyzed by XPS. As a result, it was confirmed that the particles had sulfate groups on the surface thereof. The positive electrode active materials obtained in Examples 1 and 6 to 8 can be confirmed that the particles have sulfate groups on the surface thereof.

Example 9

Predetermined amounts of lithium carbonate, tricobalt tetroxide, aluminum oxide, magnesium carbonate, and lithium sulfate hydrate are mixed by dry process to obtain a raw material mixture. The obtained raw material mixture is calcined in atmospheric gas at 900° C. for 10 hours and then pulverized by using a mortar to obtain a positive electrode active material.

Examples 10 to 17

Positive electrode active materials are obtained in the same manner as in Example 9 except that proportions of the raw materials are changed.

Examples 18 to 20

Positive electrode active materials are obtained in the same manner as in Example 9 except that aluminum hydroxide, aluminum nitrate hydrate ($Al(NO_3)_3.9H_2O$), and aluminum acetate, respectively, are used in place of aluminum oxide.

Examples 21 to 23

Positive electrode active materials are obtained in the same manner as in Example 9 except that sulfur (S), ammonium sulfate, and ammonium peroxodisulfate (($NH_4)_2.S_2O_8$), respectively, are used in place of lithium sulfate hydrate.

Example 24

A positive electrode active material is obtained in the same manner as in Example 9 except that barium carbonate is used in place of magnesium carbonate.

Example 25

A positive electrode active material is obtained in the same manner as in Example 9 except that titanium dioxide is used in place of aluminum oxide and that ratio of the amounts of the raw materials are changed.

Examples 26 to 33

Positive electrode active materials are obtained in the same manner as in Example 25 except that ratio of the amounts of the raw materials is changed.

Examples 34 to 36

Positive electrode active materials are obtained in the same manner as in Example 25 except that titanium hydroxide ($Ti(OH)_4$), titanium nitrate ($Ti(NO_3)_4$) and titanium oxalate hydrate ($Ti_2(C_2O_4)_3.10H_2O$), respectively, is used in place of titanium dioxide.

Examples 37 to 39

Positive electrode active materials are obtained in the same manner as in Example 25 except that sulfur, ammonium sulfate, and ammonium peroxodisulfate, respectively, are used in place of lithium sulfate hydrate.

Example 40

A positive electrode active material is obtained in the same manner as in Example 25 except that barium carbonate is used in place of magnesium carbonate.

Example 41

A positive electrode active material is obtained in the same manner as in Example 9 except that aluminum oxide is not used and that ratio of the amounts of the raw materials is changed.

Examples 42 to 47

Positive electrode active materials are obtained in the same manner as in Example 41 except that ratio of the amounts of the raw materials is changed.

Examples 48 to 50

Positive electrode active materials are obtained in the same manner as in Example 41 except that magnesium hydroxide, magnesium nitrate hydrate ($Mg(NO_3)_2.6H_2O$), and magnesium oxalate hydrate ($MgC_2O_4.2H_2O$), respectively, are used in place of magnesium carbonate.

Examples 51 to 53

Positive electrode active materials are obtained in the same manner as in Example 41 except that sulfur, ammonium sulfate, and ammonium peroxodisulfate, respectively, are used in place of lithium sulfate hydrate.

Example 54

A positive electrode active material is obtained in the same manner as in Example 41 except that barium carbonate is used in place of magnesium carbonate.

Example 55

A positive electrode active material is obtained in the same manner as in Example 9 except that titanium dioxide and lithium fluoride are used in place of aluminum oxide and that ratio of the amounts of the raw materials is changed.

Examples 56

A positive electrode active material is obtained in the same manner as in Example 55 except that ratio of the amounts of the raw materials is changed.

Examples 57

A positive electrode active material is obtained in the same manner as in Example 55 except that magnesium carbonate is used in place of titanium dioxide.

Examples 58

A positive electrode active material is obtained in the same manner as in Example 57 except that ratio of the amounts of the raw materials is changed.

Example 59

A positive electrode active material is obtained in the same manner as in Example 55 except that magnesium carbonate is also used as a raw material and ratio of the amounts of the raw materials is changed.

Examples 60 to 64

Positive electrode active materials are obtained in the same manner as in Example 55 except that aluminum oxide, calcium carbonate, strontium carbonate, vanadium pentoxide, and zirconium oxide, respectively, are used in place of titanium dioxide.

Examples 65 to 68

Positive electrode active materials are obtained in the same manner as in Example 55 except that ratio of the amounts of the raw materials is changed.

Examples 69 to 71

Positive electrode active materials are obtained in the same manner as in Example 55 except that lithium chloride (LiCl), lithium bromide (LiBr), and lithium iodide (LiI), respectively, are used in place of lithium fluoride.

Examples 72 and 73

Positive electrode active materials are obtained in the same manner as in Example 55 except that sulfur and ammonium sulfate, respectively, are used in place of lithium sulfate hydrate.

The compositional formulae, specific surface areas and average particle sizes of the positive electrode active materials obtained in Examples 9 to 73 are shown in Table 1.

Note that the compositions are measured by flame photometry for Li, by titration method for Co, or by ICP emission spectroscopic analysis for the other elements. The specific surface areas are measured by a constant pressure BET single point method according to nitrogen gas absorption. The average particle sizes are an average value of the particle sizes of primary particles which is calculated from specific surface areas measured by an air permeation method using Fisher Subsieve Sizer (F.S.S.S.).

TABLE 1

| | Compositional formula | Specific surface ($m^2/g$) | Average particle size ($\mu m$) |
|---|---|---|---|
| Example 9 | $LiCo_{0.989}Al_{0.01}Mg_{0.001}O_2S_{0.005}$ | 0.62 | 3.5 |
| Example 10 | $LiCo_{0.998}Al_{0.001}Mg_{0.001}O_2S_{0.005}$ | 0.62 | 3.5 |
| Example 11 | $LiCo_{0.949}Al_{0.05}Mg_{0.001}O_2S_{0.005}$ | 0.62 | 3.5 |
| Example 12 | $LiCo_{0.985}Al_{0.01}Mg_{0.005}O_2S_{0.005}$ | 0.64 | 3.3 |
| Example 13 | $LiCo_{0.98}Al_{0.01}Mg_{0.01}O_2S_{0.005}$ | 0.65 | 3.3 |
| Example 14 | $LiCo_{0.989}Al_{0.01}Mg_{0.001}O_2S_{0.003}$ | 0.63 | 3.5 |
| Example 15 | $LiCo_{0.989}Al_{0.01}Mg_{0.001}O_2S_{0.009}$ | 0.64 | 3.4 |
| Example 16 | $LiCo_{0.989}Al_{0.01}Mg_{0.001}O_2S_{0.012}$ | 0.64 | 3.4 |
| Example 17 | $LiCo_{0.989}Al_{0.01}Mg_{0.001}O_2S_{0.015}$ | 0.65 | 3.4 |
| Example 18 | $LiCo_{0.989}Al_{0.01}Mg_{0.001}O_2S_{0.005}$ | 0.63 | 3.5 |
| Example 19 | $LiCo_{0.989}Al_{0.01}Mg_{0.001}O_2S_{0.005}$ | 0.63 | 3.5 |
| Example 20 | $LiCo_{0.989}Al_{0.01}Mg_{0.001}O_2S_{0.005}$ | 0.64 | 3.4 |
| Example 21 | $LiCo_{0.989}Al_{0.01}Mg_{0.001}O_2S_{0.005}$ | 0.64 | 3.4 |
| Example 22 | $LiCo_{0.989}Al_{0.01}Mg_{0.001}O_2S_{0.005}$ | 0.63 | 3.5 |
| Example 23 | $LiCo_{0.989}Al_{0.01}Mg_{0.001}O_2S_{0.005}$ | 0.63 | 3.5 |
| Example 24 | $LiCo_{0.989}Al_{0.01}Ba_{0.001}O_2S_{0.005}$ | 0.64 | 3.4 |
| Example 25 | $LiCo_{0.998}Ti_{0.001}Mg_{0.001}O_2S_{0.005}$ | 0.62 | 3.5 |
| Example 26 | $LiCo_{0.994}Ti_{0.005}Mg_{0.001}O_2S_{0.005}$ | 0.62 | 3.5 |
| Example 27 | $LiCo_{0.989}Ti_{0.01}Mg_{0.001}O_2S_{0.005}$ | 0.63 | 3.5 |
| Example 28 | $LiCo_{0.994}Ti_{0.001}Mg_{0.005}O_2S_{0.005}$ | 0.64 | 3.3 |
| Example 29 | $LiCo_{0.989}Ti_{0.001}Mg_{0.01}O_2S_{0.005}$ | 0.65 | 3.3 |
| Example 30 | $LiCo_{0.998}Ti_{0.001}Mg_{0.001}O_2S_{0.003}$ | 0.63 | 3.5 |
| Example 31 | $LiCo_{0.998}Ti_{0.001}Mg_{0.001}O_2S_{0.009}$ | 0.63 | 3.5 |
| Example 32 | $LiCo_{0.998}Ti_{0.001}Mg_{0.001}O_2S_{0.012}$ | 0.63 | 3.4 |
| Example 33 | $LiCo_{0.998}Ti_{0.001}Mg_{0.001}O_2S_{0.015}$ | 0.64 | 3.4 |
| Example 34 | $LiCo_{0.998}Ti_{0.001}Mg_{0.001}O_2S_{0.005}$ | 0.63 | 3.5 |
| Example 35 | $LiCo_{0.998}Ti_{0.001}Mg_{0.001}O_2S_{0.005}$ | 0.63 | 3.5 |
| Example 36 | $LiCo_{0.998}Ti_{0.001}Mg_{0.001}O_2S_{0.005}$ | 0.64 | 3.4 |
| Example 37 | $LiCo_{0.998}Ti_{0.001}Mg_{0.001}O_2S_{0.005}$ | 0.64 | 3.4 |
| Example 38 | $LiCo_{0.998}Ti_{0.001}Mg_{0.001}O_2S_{0.005}$ | 0.63 | 3.5 |
| Example 39 | $LiCo_{0.998}Ti_{0.001}Mg_{0.001}O_2S_{0.005}$ | 0.63 | 3.5 |
| Example 40 | $LiCo_{0.998}Ti_{0.001}Ba_{0.001}O_2S_{0.005}$ | 0.64 | 3.4 |
| Example 41 | $LiCo_{0.999}Mg_{0.001}O_2S_{0.005}$ | 0.63 | 3.5 |
| Example 42 | $LiCo_{0.995}Mg_{0.005}O_2S_{0.005}$ | 0.62 | 3.5 |
| Example 43 | $LiCo_{0.99}Mg_{0.01}O_2S_{0.005}$ | 0.63 | 3.5 |
| Example 44 | $LiCo_{0.999}Mg_{0.001}O_2S_{0.003}$ | 0.62 | 3.5 |
| Example 45 | $LiCo_{0.999}Mg_{0.001}O_2S_{0.009}$ | 0.63 | 3.4 |
| Example 46 | $LiCo_{0.999}Mg_{0.001}O_2S_{0.012}$ | 0.64 | 3.4 |
| Example 47 | $LiCo_{0.999}Mg_{0.001}O_2S_{0.015}$ | 0.64 | 3.4 |
| Example 48 | $LiCo_{0.999}Mg_{0.001}O_2S_{0.005}$ | 0.63 | 3.5 |
| Example 49 | $LiCo_{0.999}Mg_{0.001}O_2S_{0.005}$ | 0.63 | 3.5 |
| Example 50 | $LiCo_{0.999}Mg_{0.001}O_2S_{0.005}$ | 0.64 | 3.4 |
| Example 51 | $LiCo_{0.999}Mg_{0.001}O_2S_{0.005}$ | 0.64 | 3.4 |
| Example 52 | $LiCo_{0.999}Mg_{0.001}O_2S_{0.005}$ | 0.63 | 3.5 |
| Example 53 | $LiCo_{0.999}Mg_{0.001}O_2S_{0.005}$ | 0.63 | 3.5 |
| Example 54 | $LiCo_{0.999}Ba_{0.001}O_2S_{0.005}$ | 0.64 | 3.4 |
| Example 55 | $LiCo_{0.999}Ti_{0.001}O_2F_{0.002}S_{0.005}$ | 0.63 | 3.6 |
| Example 56 | $LiCo_{0.995}Ti_{0.005}O_2F_{0.002}S_{0.005}$ | 0.65 | 3.5 |
| Example 57 | $LiCo_{0.999}Mg_{0.001}O_2F_{0.002}S_{0.005}$ | 0.63 | 3.5 |
| Example 58 | $LiCo_{0.995}Mg_{0.005}O_2F_{0.002}S_{0.005}$ | 0.63 | 3.4 |
| Example 59 | $LiCo_{0.998}Ti_{0.001}Mg_{0.001}O_2F_{0.002}S_{0.005}$ | 0.63 | 3.5 |
| Example 60 | $LiCo_{0.999}Al_{0.001}O_2F_{0.002}S_{0.005}$ | 0.63 | 3.3 |
| Example 61 | $LiCo_{0.999}Ca_{0.001}O_2F_{0.002}S_{0.005}$ | 0.64 | 3.4 |
| Example 62 | $LiCo_{0.999}Sr_{0.001}O_2F_{0.002}S_{0.005}$ | 0.65 | 3.3 |
| Example 63 | $LiCo_{0.999}V_{0.001}O_2F_{0.002}S_{0.005}$ | 0.64 | 3.4 |
| Example 64 | $LiCo_{0.999}Zr_{0.001}O_2F_{0.002}S_{0.005}$ | 0.65 | 3.3 |
| Example 65 | $LiCo_{0.999}Ti_{0.001}O_2F_{0.01}S_{0.005}$ | 0.62 | 3.5 |
| Example 66 | $LiCo_{0.999}Ti_{0.001}O_2F_{0.05}S_{0.005}$ | 0.62 | 3.5 |
| Example 67 | $LiCo_{0.999}Ti_{0.001}O_2F_{0.002}S_{0.001}$ | 0.59 | 3.7 |
| Example 68 | $LiCo_{0.999}Ti_{0.001}O_2F_{0.002}S_{0.009}$ | 0.62 | 3.5 |
| Example 69 | $LiCo_{0.999}Ti_{0.001}O_2Cl_{0.002}S_{0.005}$ | 0.61 | 3.6 |
| Example 70 | $LiCo_{0.999}Ti_{0.001}O_2Br_{0.002}S_{0.005}$ | 0.61 | 3.6 |
| Example 71 | $LiCo_{0.999}Ti_{0.001}O_2I_{0.002}S_{0.005}$ | 0.61 | 3.6 |
| Example 72 | $LiCo_{0.999}Ti_{0.001}O_2F_{0.002}S_{0.005}$ | 0.64 | 3.4 |
| Example 73 | $LiCo_{0.999}Ti_{0.001}O_2F_{0.002}S_{0.005}$ | 0.63 | 3.5 |

2. Evaluation of Positive Electrode Active Materials

For each of the positive electrode active materials obtained as described above, a cylindrical battery was fabricated and initial discharge capacity, cycle characteristics, high rate characteristics, thermal stability, and presence or absence of gas generation were evaluated as follows.

The cylindrical batteries were fabricated as follows.

90 parts by weight of powder of the positive electrode active material, 5 parts by weight of electroconducting agent (carbon powder), and 5 parts by weight of polyvinylidene fluoride were kneaded in normal methylpyrrolidone solution to prepare a paste, which was coated on a positive electrode collector to obtain a positive plate by drying. As a negative plate, a carbon material was used. As a separator, a porous polypropylene film was used. As an electrolytic solution, a solution of $LiPF_6$ in a mixed solvent: ethylene carbonate/diethyl carbonate=1/1 (volume ratio) in a concentration of 1 mol/L was used. The positive plate, negative plate and separator were formed into thin sheets, which were rolled and housed in a metal-made cylindrical battery case. Injection of the electrolytic solution in the battery case produced a cylindrical battery of lithium ion secondary battery.

(1) Initial Discharge Capacity

A cylindrical battery was subjected to aging charge and discharge under a predetermined condition. Subsequently, it was charged at constant current and constant voltage at 25° C. at a current of 1.6 A to 4.2 V. Then, it was discharged at a current of 1.6 A to 2.75 V. The discharge capacity obtained then was defined as initial discharge capacity.

(2) Cycle Characteristics

A cylindrical battery was subjected to 30 cycles of charge-discharge cycle consisting of charging at constant current and constant voltage at 25° C. at a current of 1.6 A to 4.2 V and then discharging at a current of 1.6 A to 2.75 V. Volume retention at the 30th cycle was obtained by the following formula.

Volume retention (%)=(Discharge capacity at 30th cycle/Discharge capacity at 1st cycle)×100

(3) Load Characteristics

Load characteristics of a cylindrical battery was evaluated by "shoulder form". Here, in a discharge curve of a secondary battery, the portion where voltage decreases in a late stage of discharging is called "shoulder" and its form is called "shoulder form". The closer the shoulder form to right angles, the more excellent the high rate characteristics is.

Figure 8:
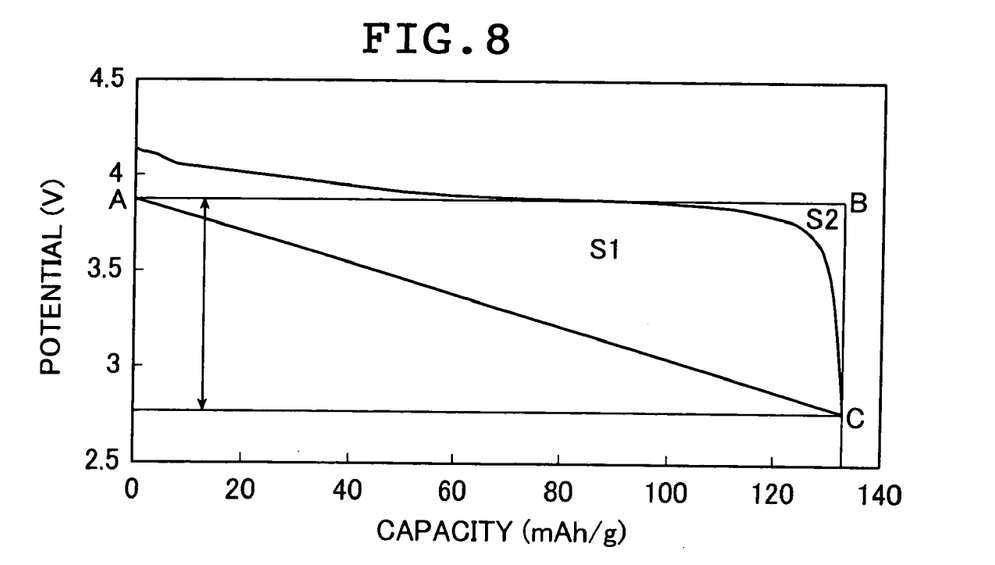
FIG. 8 is an explanatory drawing for an evaluation method for a shoulder form.

FIG. 8 is an explanatory drawing for an evaluation method for shoulder form. As shown in FIG. 8, assuming that intersection points where a line indicating flat voltage (voltage at the portion of a discharge curve at which its inclination is closest to 0) at the time of discharging crosses lines indicating capacities at the start and at the end of discharge are named A and B, respectively, and that an intersection point where a line indicating voltage at the end of discharge crosses a line indicating capacity at the end of discharge is named C, areas of regions above or below a discharge curve inside a right-angled triangle ABC are defined S1 and S2, respectively. In this situation, shoulder form was evaluated by a value of $(S1/(S1+S2))^4 \times 100$. The closer to 100 this value is, the more excellent the high rate characteristics is.

(4) Thermal Stability 90 parts by weight of powder of the positive electrode active material, 5 parts by weight of carbon as an electroconducting agent, and 5 parts by weight of PVDF (polyvinylidene fluoride) were kneaded to prepare a paste. The obtained paste was coated on a demountable type positive electrode collector of a cell, which permitted evaluation of a single electrode, to fabricate a secondary battery, which was then subjected to charge and discharge at constant current for conditioning. Thereafter, the battery was charged under a constant current to a battery voltage of 4.3 V. After completion of the charging, the positive electrode was taken out of the demountable type secondary battery, washed and dried. From the positive electrode, the positive electrode active material was scraped. In an Al cell, about 2.0 mg of ethylene carbonate to be used for an electrolytic solution and about 5 mg of the positive electrode active material scraped from the positive electrode were charged and differential scanning calorimetry was performed.

Differential scanning calorimetry is a method for measuring a difference in energy input between a substance and a standard substance as a function of temperature while varying the temperatures of the substance and the standard substance according to a program. At low temperature portions, calorie obtained by differential scanning did not change even when the temperature was elevated but it increased greatly at a certain temperature or higher. The temperature then was defined as heat generation starting temperature. The higher the heat generation starting temperature, the better the thermal stability.

(5) Presence or Absence of Gas Generation

A cylindrical battery was charged at a constant current under a charge load of 0.5 C to 4.2 V (here, 1 C being a current load under which charge or discharge is completed in 1 hour) and then stored at 80° C. for 2 days. Expansion coefficient of the battery during the storage was obtained by the following formula and presence or absence of gas generation was evaluated based thereon.

Expansion coefficient (%) of battery=((Thickness of battery after storage at 80° C.−Thickness of battery before measurement)/Thickness of battery before measurement)×100

The results obtained in Examples 1 to 5 are shown in Table 2. Note that in Table 2, "-" indicates that no measurement was made.

From Table 2, it was revealed that the positive electrode active materials according to the present invention were excellent in cycle characteristics and high rate characteristics.

TABLE 2

|  | Initial discharge capacity (mAh/g) | Cycle characteristics (%) | Shoulder form | Load potential (V) |
|---|---|---|---|---|
| Example 1 | — | 92 | 59.02 | 3.809 |
| Example 2 | 159.65 | 89 | 63.53 | 3.816 |
| Example 3 | — | 91 | 60.65 | 3.819 |
| Example 4 | 158.96 | — | 59.82 | — |
| Example 5 | 156.56 | 85 | 67.01 | 3.842 |

What is claimed is:

1. A positive electrode active material for a lithium ion secondary battery expressed by general formula:

$Li_vCo_{1-x}M^1_wM^2_xO_yS_z$ (wherein $M^1$ represents Al or Ti; $M^2$ represents Mg and/or Ba; v represents a number satisfying $0.95 \leq v \leq 1.05$; w represents 0, or a number satisfying $0 < w \leq 0.10$ when $M^1$ is Al or a number satisfying $0 < w \leq 0.05$ when $M^1$ is Ti; x represents a number satisfying $0 < x \leq 0.10$; y represents a number satisfying $1 \leq y \leq 2.5$; and z represents a number satisfying $0 < z \leq 0.015$).

* * * * *